(12) United States Patent
Strowitzki

(10) Patent No.: US 6,782,030 B2
(45) Date of Patent: Aug. 24, 2004

(54) GAS LASER

(76) Inventor: Claus Strowitzki, Megginhartstrasse 1, 82205 Gilching (DE)

(*) Notice: Subject to any disclaimer, the term of this patent is extended or adjusted under 35 U.S.C. 154(b) by 261 days.

(21) Appl. No.: 10/187,324

(22) Filed: Jul. 1, 2002

(65) Prior Publication Data
US 2003/0016717 A1 Jan. 23, 2003

(30) Foreign Application Priority Data
Jul. 5, 2001 (EP) .............................. 01116349

(51) Int. Cl.[7] .............................................. H01S 3/097
(52) U.S. Cl. ................... 372/87; 372/38.05; 372/38.02; 372/82; 372/57
(58) Field of Search ................. 372/87, 38.05, 372/38.02, 38.1, 82, 57, 33, 8

(56) References Cited

U.S. PATENT DOCUMENTS

| 4,612,642 A | * | 9/1986 | Whitney et al. | 372/33 |
| 4,686,682 A | * | 8/1987 | Haruta et al. | 372/87 |
| 5,081,638 A | | 1/1992 | Gallant et al. | 372/86 |
| 5,771,258 A | * | 6/1998 | Morton et al. | 372/57 |
| 6,188,709 B1 | * | 2/2001 | Webb | 372/57 |
| 6,389,049 B2 | * | 5/2002 | Yoshida et al. | 372/38.02 |
| 6,414,978 B2 | * | 7/2002 | Bragin et al. | 372/58 |
| 6,628,693 B1 | * | 9/2003 | Ishihara et al. | 372/87 |
| 6,650,676 B2 | * | 11/2003 | Kojima | 372/55 |
| 6,654,403 B2 | * | 11/2003 | Ujazdowski et al. | 372/87 |
| 6,714,576 B2 | * | 3/2004 | Strowitzki | 372/57 |
| 2003/0016717 A1 | * | 1/2003 | Strowitzki | 372/55 |

FOREIGN PATENT DOCUMENTS

| DE | 3716873 A1 | 12/1988 | ............. H01S/3/22 |
| EP | 1 085 623 | 3/2001 | ......... H01S/3/0971 |
| JP | 60004280 | 1/1985 | ............. H01S/3/03 |
| JP | 07240556 | 9/1995 | ......... H01S/3/0977 |
| JP | 2001060733 | 3/2001 | ......... H01S/3/0977 |

OTHER PUBLICATIONS

Questek Series 2000 Excimer Lasers—1985—pp. 1–23.

* cited by examiner

Primary Examiner—Leon Scott, Jr.
(74) Attorney, Agent, or Firm—Womble Carlyle Sandridge & Rice

(57) ABSTRACT

The present invention relates to a gas laser with a high-voltage electrode 12 and a ground electrode 14, which electrodes 12, 14 are disposed relative to each other so as to form a discharge gap 16 between them, and with high voltage generating means including a circuit having at least one storage capacitor and at least one secondary capacitor 18, 20, said secondary capacitor 18, 20 being disposed in the area of said high-voltage electrode 12 within a discharge chamber 32 filled with laser gas. Said secondary capacitor 18, 20 includes at least one external surface 28, 28' oriented towards said high-voltage electrode 12 and made of a material which is inert with respect to said laser gas, which external surface 28, 28' forms at least one boundary surface of a flow channel 26, 26' for said laser gas.

13 Claims, 1 Drawing Sheet

Figure:
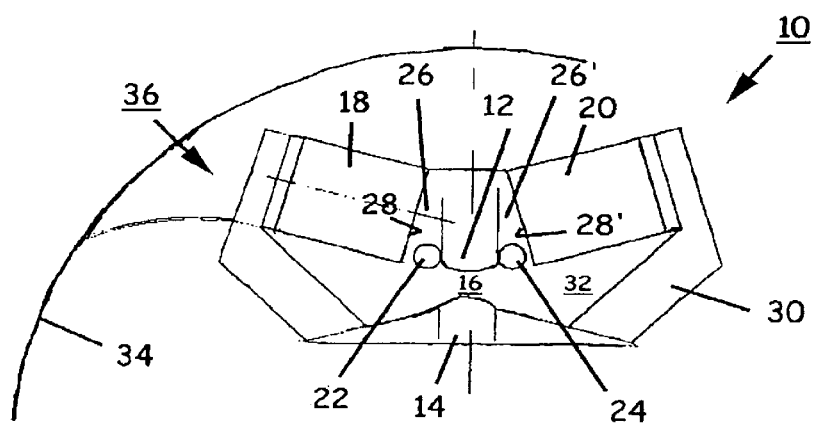

GAS LASER

CROSS-REFERENCE TO RELATED APPLICATIONS

This application claims convention priority from European patent application no. 01 116 349.0, with a filing date of Jul. 5, 2001. The specification and drawing of the European patent application are specifically incorporated herein by this reference.

BACKGROUND OF THE INVENTION

The present invention relates to a gas laser with a high-voltage electrode and a ground electrode, said high-voltage electrode and said ground electrode being disposed relative to each other in such a manner that a discharge gap is formed between them, and with high voltage generating means including a circuit having at least one storage capacitor as well as at least one secondary capacitor which latter is disposed in the area of the high-voltage electrode within a discharge chamber filled with laser gas.

Gas lasers of this type are known in the prior art. A 1986 brochure of Questek Inc. for example discloses an excimer laser of the 2000 series in which the secondary capacitors, also referred to as peaking capacitors, may be disposed in the immediate vicinity of the electrodes in the laser gas. This spatial vicinity helps maintain a connection of as low as possible inductance between the high-voltage electrode and the secondary capacitors. In such a design, it is no longer necessary to provide low-inductance lead-throughs of the high voltage into the laser tube—making the gas laser simpler in design, thus allowing its production at lower costs. Moreover, the low inductance will result in enhanced gas laser efficiency. In addition, pulse energy fluctuation will be reduced, resulting in enhanced energy stability. In spite of the aforementioned advantages of this prior art gas laser, this known design was abandoned again since it had considerable shortcomings regarding the service life of its components and of the gas used. The abovementioned Questek Inc. brochure for example describes the advantageous arrangement of the secondary capacitors outside the discharge chamber.

It is known, furthermore, how significant the laser gas flow channel is for the quality of the discharge and the magnitude of the repetition rate. High flow velocities and a laser gas flow which should be as laminar as possible will increase the efficiency and the energy stability of the gas laser since there will be a fast laser gas exchange between the electrodes in the time period between two discharges. Disclosed in U.S. Pat. No. 5,771,258, for example, is a design with optimized flow, using the shape of a Venturi tube having an opening angle of approx. 30°. This will allow a considerable increase of the laser gas flow velocity, resulting in a reduction of the inter-discharge time period and thus in higher repetition rates.

Furthermore, German document DE 37 16 873 A1 describes a gas laser which, for increasing its performance, has been designed such that a continuous gas flow is present in the gas discharge chamber which flow is to be optimized by means of appropriate additional reflectors.

However, what is disadvantageous about these prior art designs is that their construction is very time-consuming, and moreover, that the use of additional components makes it impossible to reduce the corresponding prior art gas lasers in size.

It is, therefore, at least one object of the present invention to provide a generic gas laser which will overcome the abovementioned shortcomings of the prior art gas lasers and which exhibits a low head inductance, increased efficiency and enhanced energy stability as well as a prolonged service life of the components and of the laser gas, at the same time allowing a simple and small-dimensioned design.

SUMMARY OF THE INVENTION

In an inventive gas laser, the secondary capacitor or peaking capacitor has at least one external surface oriented towards a high-voltage electrode and made of a material which is inert with respect to the laser gas, said external surface forming at least one boundary surface of a flow channel for the laser gas. Disposing the secondary capacitor in the area of the high-voltage electrode within a laser gas filled discharge chamber (as is actually known) will on the one hand allow a simpler and cheaper overall gas laser design. At the same time, the low inductance will, on the other hand, result in increased laser efficiency and reduced pulse energy fluctuation. By using, according to the invention, at least one external surface of the secondary capacitor oriented towards the high-voltage electrode as a flow-guiding element will in addition allow very small dimensions of the gas laser since additional flow-guiding elements such as reflectors or baffle plates within said discharge chamber will not be required. Moreover, the service life of the individual components, in particular of the secondary capacitors and also of the laser gas flowing past, will be increased due to the fact that the external surfaces of the secondary capacitors are made of a material which is inert with respect to the laser gas. Said external surfaces may be made of $BaTiO_3$ or $SrTiO_3$, for example.

DISCUSSION OF THE PREFERRED EMBODIMENTS

In an advantageous embodiment of the gas laser of the invention, plural secondary capacitors are disposed next to one another, forming a bank of capacitors, with the axis of said bank of capacitors extending in parallel to the axis of said high-voltage electrode. This will ensure that the flow is guided uniformly over the entire width of the discharge along said high-voltage electrode.

In another advantageous embodiment of the gas laser of the invention, two secondary capacitors or two banks of capacitors are provided in the direction of flow of the laser gas in parallel to the high-voltage electrode in such a manner that said high-voltage electrode will rest between the external surfaces of the respective secondary capacitors or banks of capacitors. Such an arrangement of the secondary capacitors ensures a precisely defined flow channel along the longitudinal axis of the high-voltage electrode, which will in turn allow the flow to be guided uniformly over the entire width of the discharge, minimizing any gas fluctuations between the individual discharges.

In yet another advantageous embodiment of the invention, the secondary capacitor or the bank of capacitors is cuboid- or block-shaped or also layered. This serves to optimize the direction of flow of the laser gas.

In yet another advantageous embodiment of the invention, at least two secondary capacitors are provided next to one another and spaced from each other in a bank of capacitors in such a manner that gaps are formed between the individual secondary capacitors, which gaps are closed by elements made of an inert material. Said elements may be made of a ceramic, for example. This will make a complete flow channel for the laser gas available, regardless of the size of the secondary capacitors.

In yet another advantageous embodiment of the gas laser of the invention, said gas laser includes at least one device for accelerating the laser gas circulation. Increasing the laser gas flow velocity will allow a significant increase in the discharge rate or pulse rate of the gas laser.

In yet another advantageous embodiment of the invention, at least one single- or double-core corona rod is provided between the high-voltage electrode and at least one secondary capacitor or at least one bank of capacitors. This will advantageously ensure a pre-ionization of the laser gas. In this case, the core of said corona rods may be connected to ground if the corona tubes are in the vicinity of the high-voltage electrode. However, a high voltage may also be applied to them if the corona rods are disposed in the vicinity of the ground conductor or of a lower voltage potential.

The inventive design of the gas laser is suitable for all gas discharge lasers, in particular those featuring transverse flow through the discharge zone. Such may in particular be excimer lasers in which the active laser gas is e.g. XeCl, KrF, ArF or $F_2$.

Further objects, advantages and features of the present invention will appear from the embodiment to follow, as illustrated in the single drawing.

BRIEF DESCRIPTION OF THE DRAWING

The single FIGURE is a schematic view of a gas laser according to one acceptable embodiment of the present invention.

DETAILED DESCRIPTION OF THE ILLUSTRATED EMBODIMENT

Reference is hereby made to the FIGURE in which a gas laser 10 is seen as including a high-voltage electrode 12 and a ground electrode 14. Said high-voltage electrode 12 and said ground electrode 14 are disposed relative to one another so as to form a discharge gap 16 between them. Said gas laser furthermore includes high voltage generating means with a circuit having at least one storage capacitor (not shown) and two secondary capacitors 18, 20. It can clearly be seen that, in the illustrated embodiment, the opposing secondary capacitors 18, 20 are disposed in the area or in the vicinity of said high-voltage electrode 12 within a discharge chamber 32 filled with laser gas. Said secondary capacitors 18, 20 each have an external surface 28, 28' oriented towards said high-voltage electrode 12 which forms a boundary surface of the flow channels 26, 26' for the laser gas. Said external surfaces 28, 28' of said secondary capacitors 18, 20 are made of a material which is inert with respect to the laser gas, e.g. $BaTiO_3$ or $SrTiO_3$. Besides said external surfaces 28, 28', the remaining elements of said secondary capacitors 18, 20 may also be made of $BaTiO_3$ or $SrTiO_3$.

In the embodiment, said secondary capacitors 18, 20 form two banks of capacitors which are provided in the direction of flow of said laser gas in parallel to said high-voltage electrode 12, with said high-voltage electrode 12 resting between said external surfaces 28, 28' of said banks of capacitors. Said secondary capacitors 18, 20 are cuboid in shape. However, it is also possible to make them block-shaped or layered. The only important thing is that one of said external surfaces of the secondary capacitor(s) should point in the direction of the high-voltage electrode 12, thus forming a boundary surface of a corresponding flow channel.

A surface of the secondary capacitor 20 opposite said external surface 28' is connected to a ground return conductor 30 which is in turn ground-conductively connected to the ground electrode 14.

The FIGURE further shows that a corona rod 22, 24 each is provided between said high-voltage electrode 12 and said secondary capacitors 18, 20. These rods are used for a pre-ionization of the laser gas. These corona rods 22, 24 may have one or two conductive cores.

The abovementioned elements of the gas laser 10 are disposed within a discharge unit 36. Said discharge unit 36 may be modular in design, allowing easy exchange, e.g. for the maintenance of individual components. Said discharge unit 36 is provided within a tube-like housing 34.

Those skilled in the art will appreciate that modifications to the exemplary embodiments of the present invention are possible without departing from the spirit and scope of the present invention. Accordingly, the foregoing description of the exemplary embodiments is provided for the purpose of illustrating principles of the present invention and not in limitation thereof, since the spirit and scope of the present invention is ultimately defined by the claims.

I claim:

1. A gas laser with a high-voltage electrode and a ground electrode, which electrodes are disposed relative to each other so as to form a discharge gap between them, and with high voltage generating means including a circuit having at least one storage capacitor and at least one secondary capacitor, said secondary capacitor being disposed in the area of said high-voltage electrode within a discharge chamber filled with laser gas, wherein said secondary capacitor includes at least one external surface oriented towards said high-voltage electrode, said external surface is made of a material which is inert with respect to said laser gas, and which external surface forms at least one boundary surface of a flow channel for said laser gas.

2. The gas laser as claimed in claim 1 wherein a plurality of secondary capacitors are disposed next to one another forming a bank of capacitors, with the axis of said bank of capacitors extending in parallel to the axis of said high-voltage electrode.

3. The gas laser as claimed in claims 2, wherein two secondary capacitors or two banks of capacitors are disposed in the direction of flow of said laser gas in parallel to said high-voltage electrode in such a manner that said high-voltage electrode will rest between said external surfaces of the respective secondary capacitors or banks of capacitors.

4. The gas laser as claimed in claim 2 wherein at least one single- or double-core corona rod is provided between said high-voltage electrode and at least one secondary capacitor or at least one bank of capacitors.

5. The gas laser as claimed in claims 1, wherein two secondary capacitors or two banks of capacitors are disposed in the direction of flow of said laser gas in parallel to said high-voltage electrode in such a manner that said high-voltage electrode will rest between said external surfaces of the respective secondary capacitors or banks of capacitors.

6. The gas laser as claimed in claim 1 wherein said secondary capacitor is of cuboid or block shape or layered.

7. The gas laser as claimed in claim 1 wherein said external surfaces are made of $BaTiO_3$ or $SrTiO_3$.

8. The gas laser of claim 1 wherein at least one surface of said secondary capacitor opposite said external surface is connected to a ground return conductor.

9. The gas laser as claimed in claim 7 wherein said elements are made of a ceramic.

10. The gas laser as claimed in claim 1 wherein at least two secondary capacitors are provided next to one another and spaced from each other within a bank of capacitors in such a manner that gaps are formed between the individual secondary capacitors, which gaps are closed by means of elements of an inert material.

11. The gas laser as claimed in claim 1 wherein said gas laser includes at least one means for accelerating the laser gas circulation.

12. The gas laser as claimed in claim 1 wherein at least one single- or double-core corona rod is provided between said high-voltage electrode and at least one secondary capacitor or at least one bank of capacitors.

13. The gas laser as claimed in claim 1 wherein said gas laser is an excimer laser.

* * * * *